United States Patent [19]

Foster et al.

[11] Patent Number: 4,684,046
[45] Date of Patent: Aug. 4, 1987

[54] UNIT DOSE LIQUID DISPENSER HAVING PRECISE DOSAGE CAPABILITIES

[75] Inventors: Donald D. Foster, Lee's Summit; Phil L. Nelson, Kansas City, both of Mo.

[73] Assignee: Realex Corporation, Kansas City, Mo.

[21] Appl. No.: 776,683

[22] Filed: Sep. 16, 1985

[51] Int. Cl.⁴ ............................................. G01F 11/28
[52] U.S. Cl. ................... 222/451; 222/454; 222/521
[58] Field of Search ............................. 222/450–454, 222/362–363, 446, 447, 520–522

[56] References Cited

U.S. PATENT DOCUMENTS

| | | | |
|---|---|---|---|
| 1,914,766 | 6/1933 | Zalosehen | 222/452 |
| 2,119,463 | 5/1938 | Lewis | 222/452 |
| 2,297,830 | 10/1942 | Hardage | 222/451 |
| 2,530,012 | 11/1950 | Gronemeyer et al. | 222/451 |
| 2,828,893 | 4/1958 | Stewart et al. | 222/453 |
| 2,864,538 | 12/1958 | Rasmussen | 222/453 |
| 2,980,302 | 4/1961 | Rasmussen | 222/453 |

Primary Examiner—H. Grant Skaggs
Attorney, Agent, or Firm—Schmidt, Johnson, Hovey & Williams

[57] ABSTRACT

An economical, non-clogging apparatus for dispensing premeasured amounts of liquid from a container placed on a shelf is provided which contains no spring, has a secure shipping mode, permits one-handed operation, has few moving parts, and avoids liquid wastage by preventing inadvertent removal of the rotatable outer cap. In preferred forms, the apparatus includes a tubular, stationary member received partly within the container's outlet neck a tubular, movable member coupled with and received partly within the stationary member, and a stem co-axially received within the movable member and coupled with the stationary member. These components cooperatively define a measuring chamber, an inlet opening, and an outlet aperture. Counterclockwise rotation of the movable member causes the stem to move from its shipping position and open the inlet opening, thereby filling the chamber with liquid while maintaining the outlet in a closed position; clockwise rotation of the movable member causes the inlet to close and the outlet aperture to open, thereby dispensing the premeasured liquid. The apparatus hereof can be used on a wide variety of containers and liquids such as bottles of household liquid detergent or large containers of industrial chemicals.

4 Claims, 10 Drawing Figures

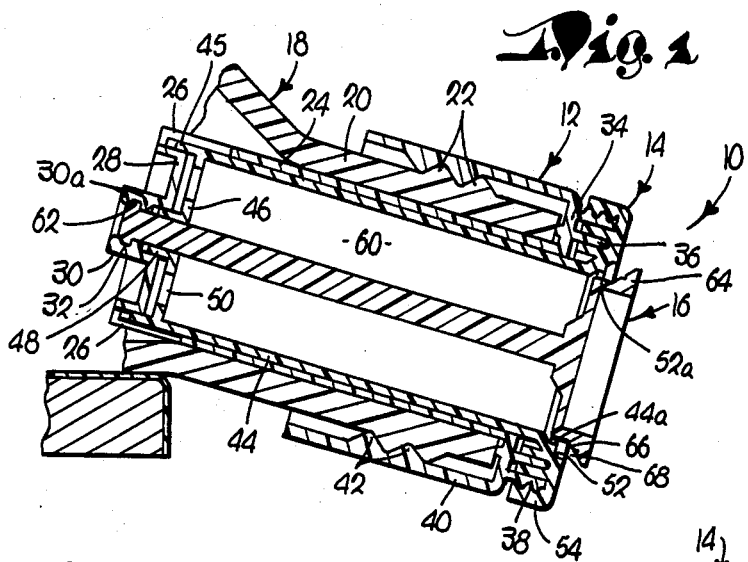
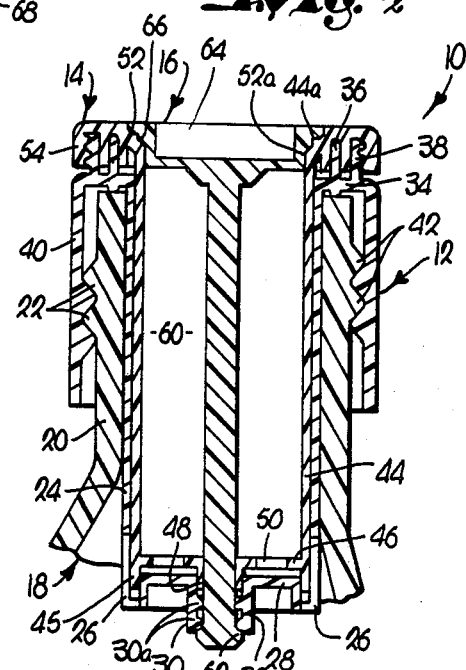
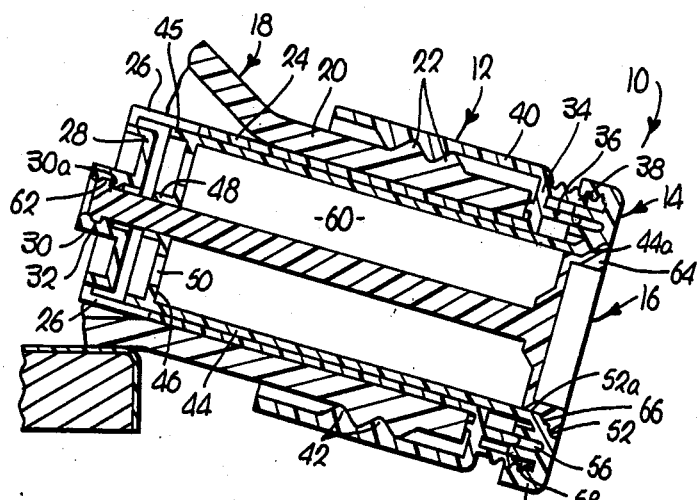
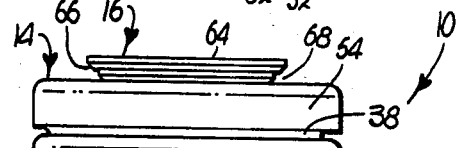
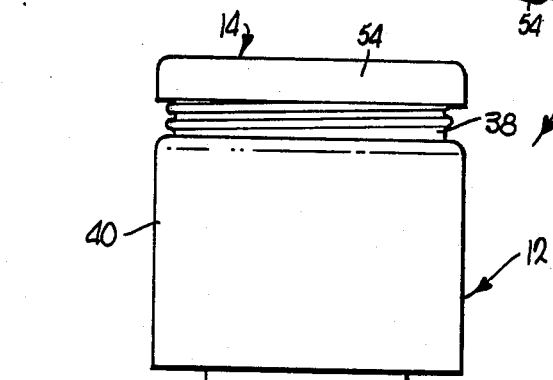
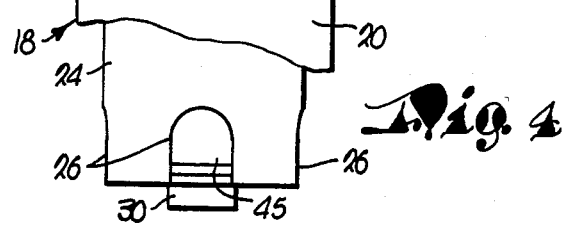

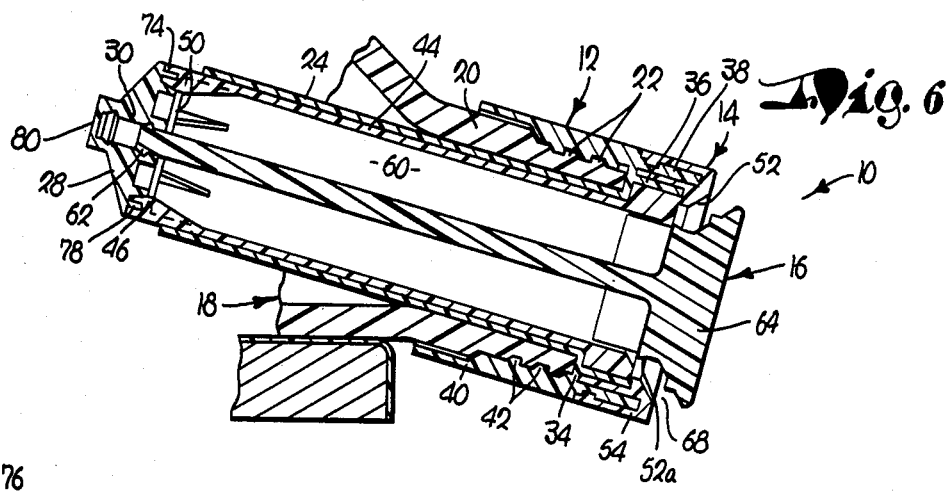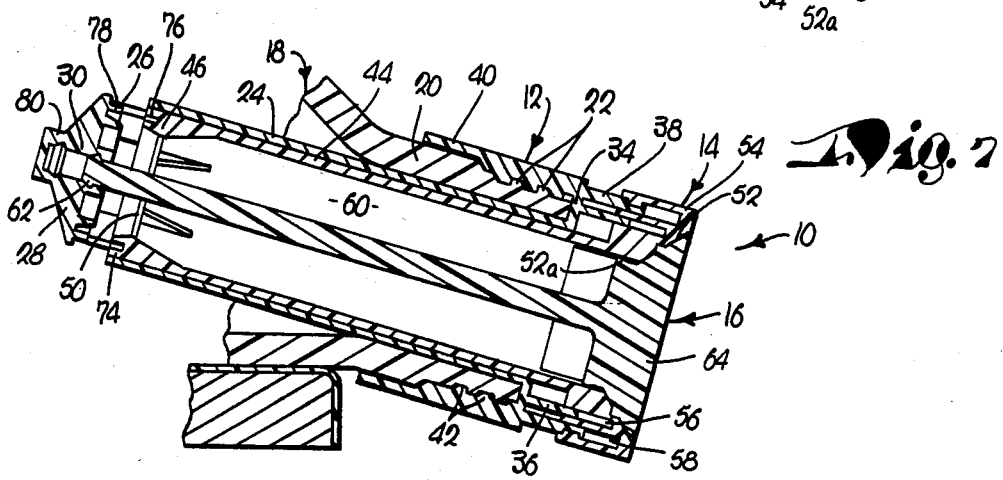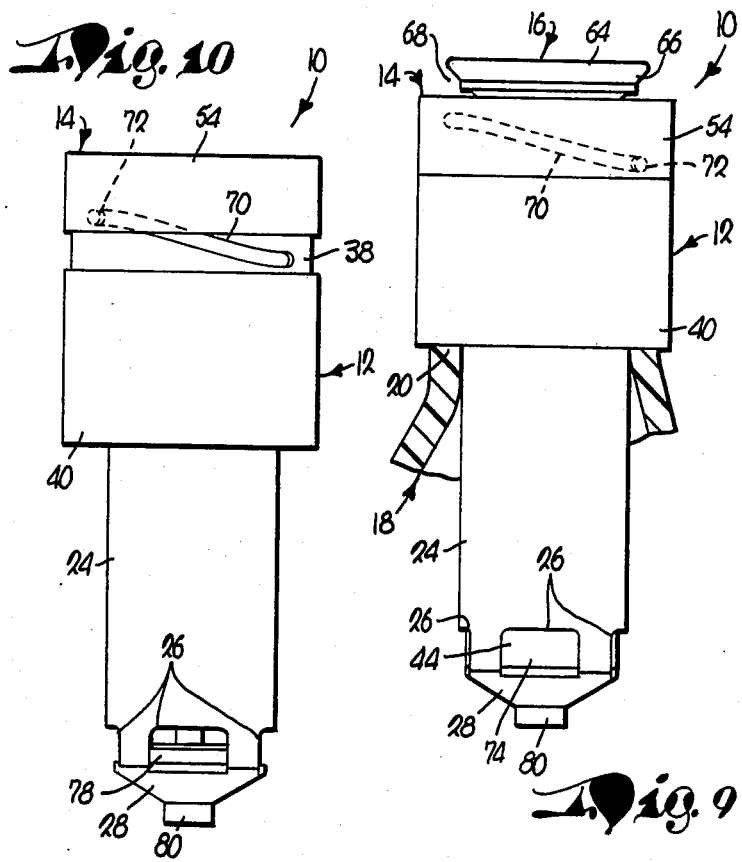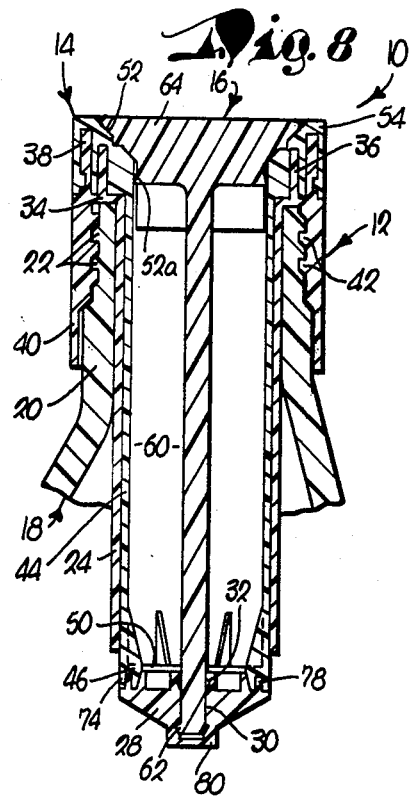

UNIT DOSE LIQUID DISPENSER HAVING PRECISE DOSAGE CAPABILITIES

BACKGROUND OF THE INVENTION

1. Field of the Invention

This invention relates to liquid metering devices of the type which are attached to or installed upon liquid product containers to normally maintain the outlets of such containers closed during periods of nonuse, but which, when actuated, are operable to dispense by gravity relatively precise amounts of liquid contents.

2. Description of the Prior Art

Devices for dispensing premeasured amounts of liquid from a container have been used for many years. For example, the device disclosed in U.S. Pat. No. 3,091,374 dispenses teaspoon-sized doses of medicine from a bottle. In use, this device is coupled to a threaded medicine bottle by a snugfitting tubular insert received within the bottle neck and an outer tubular rotatable cap threadably coupled to the outside of the bottle neck. In operation, the bottle is inverted which causes a measuring chamber defined by the device structure to fill, the device outlet being closed by the action of a compressed spring holding the valve stem against an outlet hole in the center of the movable cap. Holding the bottle inverted with one hand, the user's other hand rotates and thereby extends the cap axially beyond the travel limit of the stem. This action opens the outlet hole, closes the chamber inlet, and dispenses the medicine through the outlet hole. The cap is then counter-rotated to reinitiate the dispensing cycle.

The foregoing device and other similar existing devices present a number of significant problems. For example, in using the device described above both hands are normally required, one to hold the bottle upside down and the other to rotate the cap. This device also requires the use of a helical spring which is subject to failure, may contaminate the product, and adds significantly to the expense of the device. The outlet hole, because of its size and position, is subject to clogging and requires that the bottle be held nearly perfectly vertically in order for the measured amount of liquid to totally dispense. Additionally, the cap may be inadvertently removed from the bottle neck during rotation. Finally, the device has no shipping mode whereby the container with the liquid can be shipped with the device in place and with both the inlet and outlet closed. The known prior art devices have all or many of these problems inherent in their structure.

SUMMARY OF THE INVENTION

The present invention overcomes the problems described above, and provides a greatly improved liquid dispensing apparatus for attachment to a liquid container such as household liquid detergent. Broadly stated, the apparatus of the invention includes a first tubular member operably connected to the outlet of a container, a second movable member of tubular construction rotatably coupled to the first member for selective rotatable movement of the movable member relative to the first member between a filling position and a discharge position. The first and second members cooperatively define an internal measuring or dispensing chamber, and also define respective filling and dispensing apertures communicating the chamber with the interior and exterior of the container. The first and second members are intercoupled such that when the second member is in the filling position, the filling aperture is open and the dispensing aperture is closed; conversely, in the dispensing position, the filling aperture is closed and the dispensing aperture is opened.

In preferred forms, the device includes a tubular first member inserted snugly within the outlet neck of a container. The outlet end of the first member includes a U-shaped in cross-section collar which encircles the exterior circumference of the outlet neck and engages locking ribs thereon, thus preventing inadvertent removal of the device. The shape of the collar also limits the device's insertion into the neck. The second tubular member is inserted within the first member and is threadably coupled thereto by way of a flange provided at the outward end of the second member. Additionally, the device includes an elongated central stem, the inward end of which is slidably coupled to the inward end of the first member by means of a tubular base also coupled to the inward end of the first member. The outboard end of the stem is frustoconically shaped for engaging the adjacent end of the tubular second member when this member is in the filling position. The preferred device also includes a shipping position whereby the stem is moved axially inwardly so that both filling and dispensing apertures are closed.

BRIEF DESCRIPTION OF THE DRAWINGS

FIG. 1 is a vertical sectional view of a preferred embodiment of a device in accordance with the present invention showing the device installed on a container and in the dispensing position thereof.

FIG. 2 is a view similar to FIG. 1 but showing the device in its shipping position;

FIG. 3 is a sectional view similar to FIG. 1 but showing the device in the filling position thereof;

FIG. 4 is a side view of the FIGS. 1-3 device, shown in the dispensing position;

FIG. 5 is a view similar to FIG. 4 showing the device in the filling position thereof;

FIG. 6 is a vertical sectional view of second embodiment of the present invention, shown with the device in the dispensing position and installed upon a suitable container;

FIG. 7 is a view similar to FIG. 6 but showing the device in the filling position thereof;

FIG. 8 is a view similar to FIG. 7 but showing the device in the shipping position thereof;

FIG. 9 is a side view of the second embodiment showing the device in the dispensing position thereof; and FIG. 10 is a view similar to FIG. 9 but showing the device in the filling position thereof.

DESCRIPTION OF THE PREFERRED EMBODIMENTS

The dispensing device 10 illustrated in FIGS. 1-5 is shown attached to a container which may take the form of a laydown container as disclosed in U.S. Design Letters Patent No. D-270,137, assigned to the assignee of the present invention. The device 10 is capable of functioning well with many container shapes and sizes, but a container as disclosed in the '137 patent is preferred because the container may be placed on its side and the contents supplied continuously to the device 10 by gravity without the need for up-ending the container during each dispensing operation. As will be appreciated, however, the present invention is not limited to a container of any particular configuration.

The dispensing device 10 includes three major components—a stationary member 12, a movable member 14, and a stem 16. The device 10 is installed on the neck 20 of a suitable container 18; circumscribing container neck ribs 22 are located about the extension of neck 20 as illustrted.

The stationary member 12 (FIGS. 1, 2, and 3) has a tubular portion 24 in the form of a continuous sidewall which is pressed snugly into the container neck 20. Four fluid entry ports 26 are defined in the tubular portion 24 at the inboard end thereof and in circumferentially spaced relationship to each other. A transversely mounted imperforate end base 28 is secured to the inboard end of portion 24 and defines the inner butt end of device 10. A central, inwardly extending boss element 30 is axially located at the center of base 28, and includes internal ribs 30a. The ribs 30a cooperatively define a stem-positioning slot 32 located within boss element 30.

A radially outwardly extending annular connection web 34 is integrally attached at the outboard end of portion 24, and has an integral, annular guide wall 36 extending outwardly therefrom as depicted. An annular, outwardly extending, threaded rotation wall 38 also extends from web 34 but is spaced laterally and outwardly of wall 36. A tubular, inwardly extending retaining skirt 40 is integrally attached to the margin of web 34, so as to form with portion 24 is generally U-shaped in cross-section connection portion for receiving neck 20. Integral skirt-retaining ribs 42 are circurferentially disposed about the inside surface of skirt 40; and ribs 42 complementally engage container neck ribs 22 in order to hold device 10 securely in place.

Movable member 14 includes a tubular portion 44 which slidably yet snugly fits within portion 24 of member 12. The inboard end of portion 44 forms a sealing ring 45 which fits around end base 28 as shown in in FIG. 1. A transverse end wall 46, integral with portion 44, is situated adjacent the outboard end of ring 45. Wall 46 includes a central, tubular stem guide 48. Inlet openings 50 are defined in the end wall 46 between tubular portion 44 and stem guide 48. The outboard end of portion 44 is of beveled configuration but presents a circular upstanding rib 44a, best seen in FIG. 1; this outboard end forms a movable sealing surface generally referred to by numeral 52. The inboard side of surface 52 also includes an annular sliding seal 52a. A rotation ring 54 is integrally formed adjacent the outboard end of portion 44. A circular guide slot 56 (FIG. 3) is defined about the inside surface of ring 54; guide slot 56 receives guide wall 36 as shown. A circular rotation slot 58 (FIG. 3) is also defined about the inside surface of ring 54, but is laterally spaced outwardly from slot 56. The radially outwardmost surface of slot 58 is helically threaded to complementally receive the helical threads formed on wall 38, thus rotatably coupling member 14 with stationary member 12. Member 14 and member 12 so coupled cooperatively define a central measuring chamber 60.

Stem 16 is generally cylindrical in shape and is centrally disposed along the axis of device 10. A circumferentially disposed stem-positioning rib 62 is located at the inboard end of stem 16 and complementally fits within slot 32. The outboard end of stem 16 is frustoconically shaped to form an outlet plug or stopper 64. The circumferential sealing surface 66 of stopper 64 is configured to complementally engage surface 52 and thus provide an outlet seal for device 10. These two sealing surfaces 52 and 66, when separated as shown in FIG. 1, cooperatively define an outlet aperture 68 circumferentially disposed about stopper 64.

It will thus be seen that the port 26, inlet openings 50, and outlet aperture 68 cooperatively present aperture-defining structure for the device 10. Furthermore, it will be seen that the aperture-defining structure is operably associated with the first and second members 12, 14 for alternatively establishing a filling aperture 26, 46 communicating the interior of the container 18 with the chamber 60, and a dispensing aperture 68 communicating the chamber 60 with the exterior of the container 18.

The shipping mode of device 10 is shown in FIG. 2. In this position member 14 is at the extreme of its clockwise rotation, surfaces 52 and 66 are in contact, rib 62 is in abutting engagement with the innermost face of boss 30, and ring 45 is engaged around base 28. Thus, chamber 60 is completely sealed off from any communication with the interior or exterior of the container 18.

In operation and use, the device is normally received by the user in the shipping configuration shown in FIG. 2, with device 10 already mounted on container 18. The user then places container 18 on a shelf or the like with neck 20 facing outwardly at a slight downward angle. This allows the liquid product to flow by gravity to device 10. The user then grasps rotation ring 54 and manually turns ring 54 counterclockwise, such being permitted by virtue of the coupled threads associated with wall 38 and slot 58; the snug fit of member 12 within the neck 20 prevents movement of member 12 during such rotation of member 14. As the user continues to turn member 14 counterclockwise, member 14 also moves telescopically outwardly by virtue of the described threading. This axial movement causes ring 54 to displace stopper 64 and stem 16 outwardly by virtue of the contact between surfaces 52 and 66. As this operation occurs, the innermost face of boss 30 is in contact with rib 62 and resists the outwardly directed axial movement of stem 16. Continued rotation, however, overcomes this resistance until rib 62 "snaps" into slot 32 formed in boss 30. The initial resistance to counterclockwise motion followed by the sudden decrease in resistance when rib 62 "snaps" into position provides a tactile indication to the user that device 10 is ready for use.

After rib 62 is moved into operative position, device 10 is in the filling position shown in FIG. 3. In this position, sealing ring 45 is spaced from end wall 46, portion 44 is shifted to uncover ports 26, and aperture 68 is closed. At this point, chamber 60 is in communication with the interior of container 18, and the liquid therein flows through the ports 26 and inlet openings 50 to completely fill chamber 60.

After chamber 60 is full, the user rotates member 14 clockwise by grasping ring 54. As this movement occurs, member 14 telescopes inwardly so that portion 44 covers ports 26, and ring 45 encircles base 28 thus sealing openings 50. The inward motion of movable member 14 thus causes separation of surfaces 52 and 66, thereby forming aperture 68 and allowing the liquid in chamber 60 to flow by gravity through aperture 68 (FIG. 1).

It will be noted (see FIGS. 1 and 3) that as member 14 moves inwardly, portion 44 covers the ports 26 before the seal is broken between the surfaces 52 and 66. This occurs because sliding seal 52a is wide enough to remain in contact with the interior of portion 44 for a distance approximately equal to the distance required for portion 44 to close ports 26. After the liquid product is dispensed from chamber 60, the user can then reset device 10 for another operation by counterclockwise rotation of member 14.

Attention is now directed to FIGS. 6-10 which illustrate another embodiment of the invention and which uses a different means for guiding the movement member 14 and for sealing inlet opening 50. Inasmuch as many of the components illustrated in FIGS. 6-10 are functionally indentical with those described in FIGS. 1-5, like numbers will be employed for like parts, and no further discussion of these parts will be provided.

In the second embodiment, a helical groove 70 extends part way around rotation wall 38 replacing the integral threads of the first embodiment. A cam-like protuberance 72 extends inwardly from the outboard wall of slot 58 replacing the integral threads of the first embodiment. Groove 70 receives protuberance 72 thereby rotationally coupling member 12 with member 14.

An annular inlet flange 74 extends radially inwardly from the extreme inward end of member 14. A circular inlet sealing slot 76 is defined on the inboard face of the inlet flange 74. An annular inlet sealing wall 78 extends outwardly from the outboard face of base 28. Slot 76 receives wall 78 when device 10 is in the dispensing position (FIG. 6). A cylindrical cap 80 encloses the inboard end of boss 30.

In operation of the second embodiment, the user recieves device 10 in the shipping position (FIG. 8) and mounted on a suitable container 18. The initial operation of the device is similar to that described above in connection with FIG. 2 except that with the second embodiment the user initially rotates rotation ring 54 clockwise instead of counterclockwise. After initial operation, device 10 is in the filling position shown in FIG. 7. In this position chamber 60 fills as described above in connection with the first embodiment. After chamber 60 fills, the user then rotates ring 54 counterclockwise. As this occurs, protuberance 72 follows the helical path of groove 70 which causes the member 14 to move axially inwardly. As member 14 moves inwardly, slot 76 slides over wall 78, thereby closing off openings 50. The inward movement of the member 14 also causes portion 44 to close ports 26 in a manner similar to that of the first embodiment. Rotation ceases when protuberance 72 contacts the end of groove 70 at which point device 10 is in the dispensing position shown in FIG. 6. The user reinitiates the operating cycle by clockwise rotation of ring 54.

The second embodiment of the present invention allows operation of the device from the filling to the dispensing position with less than full rotation of member 14. This adds to the operating convenience of device 10 because the user can rotate the device between its operating extremes without repositioning his or her hand.

Thus, it will be seen that the present invention provides a greatly improved liquid dispensing device which has a number of distinct advantages. One advantage is economical manufacturing cost. The device contains no springs as do some prior art devices, which spring alone can add significantly to the unit cost of such a device. Additionally, the simplicity of design making use of only three parts allows the use of economical synthetic resin molding techniques. Another advantage is the non-clogging design of the outlet aperture. The outlet aperture is formed circumferentially about the outlet stopper and thus avoids all clogging problems which could occur with prior art devices using only a single hole in the center of the outlet cap. The use of the circumferential aperture also allows the chamber to empty completely even though the device is not in a vertical up-ended position. The design of the dispensing device allows use of a container place on a shelf thereby obviating the need for repositioning the container each time the device is used. The design also provides a secure shipping mode to assure that both the inlet and outlet openings are closed for double protection while the device is in storage or shipment. Finally, the dispensing device is adapted for one-handed operation when the device is secured to a suitable container, and inadvertent removal of the movable member is prevented during use.

Those skilled in the art will appreciate the possibility of variations in the design disclosed herein which are still contemplated by the principles of the present invention. For example, the device can be adapted to fit a wide variety of container shapes, sizes, and outlet configurations. Additionally, the design is adaptable to a wide variety of construction materials such as metal, synthetic resins, or the like. These examples are but illustrative of the variations within the ambit of the present invention.

We claim:

1. Apparatus for repeatedly dispensing measured amounts of liquid product from the outlet neck of a container, said neck presenting an outlet opening, said apparatus comprising:
   a first body including
      a tubular first member being received within said neck and having an inner end and an outer end and presenting, adjacent the outer end thereof, a generally U-shaped in cross-section connection portion for receiving said outlet neck;
      an annular, axially oriented wall extending outwardly from said connection portion;
      structure defining a fluid inlet opening adjacent said inner end;
      base means adjacent said inner end;
      an elongated, axially oriented stem coupled with said base means and extending towards said outlet end,
      said stem presenting a sealing member adjacent the outer end thereof,
      said sealing member having a generally frustoconical sealing surface;
   a second body including
      a second tubular member having an inner end and an outer end, said second member being telescopically and rotatably received within said first member,
      said second tubular member including a radially outwardly extending coupling flange adjacent said outer end thereof,
      said flange having means defining an annular slot receiving said annular wall, and an inboard, generally frustoconical sealing surface complemental with the sealing surface of said sealing member,
      there being means operatively coupling said annular wall and slot-defining means for relative rotative movement between said first body and said second body;

an end wall adjacent said inner end of the second member,
said end wall including a sealing section and being apertured for slidably receiving said stem,
said end wall further having a fluid port therethrough,
said first and second tubular members cooperatively defining a measuring chamber,
said second tubular member being bidirectioally rotatable relative to said first tubular member between a dispensing position and a filling position,
said sealing section of said end wall, and said base means, cooperatively closing said opening and said port when said second tubular member is in the dispensing position thereof, and said fluid inlet opening and said fluid port being open when said second tubular member is in said filling position thereof,
said sealing surface of said first body and said sealing surface of said second body being adapted for defining therebetween a dispensing aperture, said dispensing aperture being formed when said second body is in said dispensing position and said dispensing aperture being closed when said second body is in said filling position.

2. The apparatus as defined in claim 1, said stem being selectively axially movable within said base means so that when said stem is moved axially inwardly relative to said base means to a shipping position, said sealing member engages with said flange to close said dispensing aperture and said sealing section engages said base means to close said fluid port and said fluid inlet.

3. The apparatus as defined in claim 1, said coupling means between said annular wall and slot-defining means comprising mating thread means on the annular wall and slot-defining means respectively.

4. The apparatus as defined in claim 1, said coupling means between said annular wall and said slot-defining means comprising a protuberance, said protuberance being engagingly received within a guide channel defined by the other of said slot or said annular wall.

* * * * *